United States Patent [19]

Hayes

[11] Patent Number: 5,425,999
[45] Date of Patent: Jun. 20, 1995

[54] LOW FORMALDEHYDE, HIGH GEL FRACTION LATEX BINDER

[75] Inventor: Peter C. Hayes, Stow, Ohio

[73] Assignee: GenCorp Inc., Fairlawn, Ohio

[21] Appl. No.: 192,487

[22] Filed: Feb. 7, 1994

Related U.S. Application Data

[62] Division of Ser. No. 122,821, Sep. 16, 1993, Pat. No. 5,326,853.

[51] Int. Cl.$^6$ ............................................. B32B 23/08
[52] U.S. Cl. ..................................... 428/511; 428/535
[58] Field of Search ................................. 428/511, 535

[56] References Cited

U.S. PATENT DOCUMENTS

| | | |
|---|---|---|
| 4,429,096 | 1/1984 | Schaefer . |
| 4,604,439 | 8/1986 | Colvin et al. . |
| 4,694,057 | 9/1987 | Smith et al. . |
| 4,966,791 | 10/1990 | Kissel et al. . |
| 4,983,684 | 1/1991 | Weinstein et al. . |
| 5,028,655 | 7/1991 | Stack . |
| 5,030,507 | 7/1991 | Mudge et al. . |
| 5,043,455 | 8/1991 | Parker et al. . |
| 5,143,954 | 9/1992 | Hutton et al. . |
| 5,173,557 | 12/1992 | Parket et al. . |

FOREIGN PATENT DOCUMENTS

WO9207823  5/1992  WIPO .

OTHER PUBLICATIONS

WPI Abstract No. 92-183583/22.

(List continued on next page.)

*Primary Examiner*—Joseph L. Schofer
*Assistant Examiner*—Jeffrey T. Smith
*Attorney, Agent, or Firm*—Robert F. Rywalski; Daniel J. Hudak

[57] ABSTRACT

A low formaldehyde, high gel fraction latex binder is made utilizing a compound having the formula

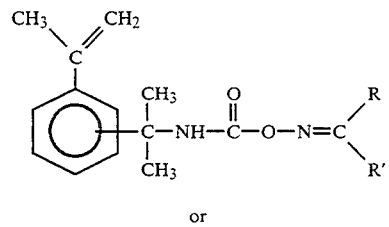

or

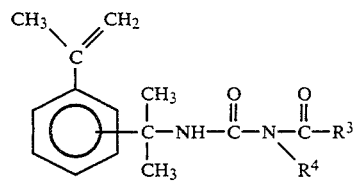

wherein R and R', independently, is an alkyl having from 1 to 10 carbon atoms, and $R^4$ is hydrogen, or wherein $R^3$ and $R^4$, independently is an alkyl, an aromatic, or combinations thereof having from 1 to 10 carbon atoms, or wherein said $R^3$ and $R^4$ are connected to form an internal amide, and wherein the isopropenyl group is either in the ortho, meta or para position. The latex binder is generally an emulsion or latex copolymer made from various monomers including at least one or more conjugated dienes having a total of from 4 to 10 carbon atoms with butadiene being preferred and from one or more vinyl-substituted aromatics having from 8 to 14 carbon atoms, with styrene being preferred. The amount of the above formulation compounds is generally from about 0.25 to about 20 parts by weight based upon 100 parts by weight of the one or more conjugated dienes and the vinyl-substituted aromatic monomers. The latex binder has good stability, and has many applications such as to bind a paper-coating composition to a cellulose substrate, or to bind non-woven fibers together. The latex binder generally contains 10 parts or less by weight of formaldehyde per million parts by weight and desirably contains nil, that is, no detectable amounts of formaldehyde therein, even after extended periods of time, e.g., 28 days.

4 Claims, 1 Drawing Sheet

OTHER PUBLICATIONS

Chem Abstract No. 113(25)226064n.
Chem Abstract No. 107(22)200469z.
Chem. Abstract No. 106(21)1754.
Chem. Abstract No. 105(8)62273m.
Chem. Abstract No. 116(6)42089e.
WPI Abstract No. 88-197985/28.
WPI Abstract No. 85-013607/03.
WPI Abstract No. 85-013606/03.
WPI Abstract No. 85-013599/03.
WPI Abstract No. 92-101599/13.
WPI Abstract No. 92-075439/10.
WPI Abstract No. 91-268615/37.
Abstract of U.S. Patent No. 4,604,439, issued Aug. 5, 1986.
An article entitled "The Condensation Products of Aldehydes and Aldo-sensitive $\beta$-Dicarbonyl Compounds[1a]," B. D. Wilson, Feb., 1963, vol. 28, pp. 314-320.

LOW FORMALDEHYDE, HIGH GEL FRACTION LATEX BINDER

CROSS-REFERENCE

This is a division of application Ser. No. 08/122,821, filed Sep. 16, 1993 now U.S. Pat. No. 5,326,853, of Peter Charles Hayes, for "LOW FORMALDEHYDE, HIGH GEL FRACTION LATEX BINDER."

FIELD OF THE INVENTION

This invention relates to high gel fraction polymeric latex compositions which can be utilized for paper coating compositions, for binding non-woven fibers together, and for processes for making and using the same. More particularly, the invention relates to such high gel fraction polymeric latex binder compositions wherein formaldehyde generation is substantially eliminated.

BACKGROUND OF THE INVENTION

Latex binder compositions have been used in a wide variety of applications such as adhering paper coatings to cellulosic substrates, in carpet and rug backings, and in various non-woven products which have gained broad acceptance as replacements for woven fabrics, including such articles as facings or top sheets in diapers, incontinence pads, sanitary napkins, hospital gowns, and other single and multiple-use non-woven products.

Conventional latex binders have generally been prepared from acrylic polymers, styrene/acrylate copolymers, or styrene/butadiene copolymers containing N-methylol functionality which, upon curing, generate substantial quantities of formaldehyde, typically from 200 to 500 ppm or more. It is desirable to use binders which are essentially free of formaldehyde generation. Formaldehyde-free latex binders include various urethane polymers, acrylic polymers, styrene/acrylate copolymers, and the like, such as those disclosed in U.S. Pat. Nos. 2,837,462; 4,207,367; 4,381,332; 5,030,507, and others. However, none of the prior art discloses a suitable conjugated diene/vinyl-substituted aromatic copolymer latex binder which is free of formaldehyde formation, and which also exhibits superior coagulation stability and mechanical stability while imparting excellent wet tensile strength to cellulosic articles such as paper.

SUMMARY OF THE INVENTION

It has been discovered that high gel fraction latex binder compositions made from one or more conjugated diene monomers, one or more vinyl-substituted aromatic monomers, a ketoxime or amide blocked isopropenyl-α-α-dimethyl benzyl isocyanate, and one or more monomers containing functional groups such as hydroxyl, carboxyl, or primary or secondary amides can be prepared without generating significant quantities of formaldehyde. It has been further discovered that the foregoing binder compositions, described in greater detail hereinafter, unexpectedly exhibits superior coagulation as well as mechanical stability and impart superior wet tensile strength when applied to cellulosic articles.

The polymeric latex binder compositions of the invention can optionally be made from one or more ester monomers, vinyl chloride or vinylidene chloride monomers, and various stabilizer monomers.

The above monomers containing low amounts of conjugated diene, i.e. less than 60 percent by weight, are polymerized under acidic conditions and high temperatures and achieve high conversion levels of at least 90 percent to form a high gel fraction (e.g. at least 70 percent) latex binder which upon application to a substrate can be cured, i.e. crosslinked, upon heating.

DETAILED DESCRIPTION

Figure 1:
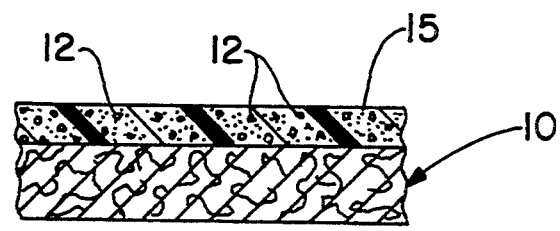
FIG. 1 relates to a cross-sectional view of a paper coating bound to a cellulose substrate with the latex binder of the present invention.

The binder-forming monomers of the present invention forming the emulsion or latex binder composition (i.e., an aqueous suspension of a copolymer) are generally well known to the art and to the literature and include a primary, sizeable or main amount of at least a conjugated diene monomer and a vinyl-substituted aromatic monomer, as well as smaller amounts of various functional containing monomers. Optional monomers include various esters, vinyl chloride or vinylidene chloride, acrylonitrile, and the like. The conjugated diene monomers generally contain from about 4 to 8 carbon atoms, and desirably from 4 to 6 carbon atoms. Examples of specific diene monomers include piperylene, isoprene, 2,3-dimethyl-1,3-butadiene, and preferably 1,3-butadiene. Mixtures of two or more conjugated dienes can also be utilized. The vinyl-substituted aromatic monomers which can be utilized in association with the conjugated dienes to form copolymers generally have from 8 to about 12 carbon atoms. Specific examples include α-methyl styrene, p-tertiary butyl styrene, methyl vinyl toluene, p-vinyl toluene, 3-ethyl styrene, and the like, with styrene being preferred. Mixtures of two or more vinyl-substituted aromatic monomers can also be utilized. The amount of the one or more conjugated diene monomers which can be utilized is generally small in comparison to latexes utilized for tires, generally ranging from about 10 to about 90 percent based upon the total amount by weight of the conjugated diene monomers and the vinyl-substituted aromatic monomers. With regard to non-woven applications, the desired range is from about 25 to about 55 or 60 percent and preferably from about 30 to about 50 percent by weight. The amount of vinyl-substituted aromatic monomers is generally the difference, that is, from about 10 to about 90 percent by weight, and with regard to non-woven applications from about 40 or 45 percent to about 75 percent by weight, and preferably from about 50 to about 70 percent by weight. With regard to cellulose applications, the desired amount of conjugated diene monomers is from about 15 to about 50 percent by weight and preferably from about 25 to about 40 percent by weight. The amount of the vinyl-substituted aromatic monomers for cellulose applications is generally the difference, that is generally from about 50 percent to about 85 percent and preferably from about 60 percent to about 75 percent by weight based upon the total weight of vinyl-substituted aromatic and conjugated diene monomers.

Examples of monomers containing functional groups include various unsaturated acids and various unsaturated amides or derivatives thereof having a total of from about 3 to about 12 carbon atoms with the exception of N-methylol-functional ethylenically unsaturated monomers. Acid monomers are desired since they improve colloidal stability as well as adhesion to a substrate. The amount of such monomers is generally from about 0.1 to about 15 parts by weight, desirably from about 0.5 to about 10 parts, and preferably from about 1.0 to about 5.0 parts by weight for every 100 parts by weight of the one or more conjugated diene and vinyl-substituted aromatic monomers. Examples of such suitable monomers include acrylic acid (preferred), methacrylic acid, maleic acid, fumaric acid, itaconic acid (preferred), hydroxyethyl acrylate (a preferred compound), hydroxyethyl methacrylate, hydroxymethyl acrylate, hydroxymethyl methacrylate, hydroxypropyl acrylate, hydroxypropyl methacrylate, (meth) acrylamide (preferred), dimethylacrylamide, derivatives of the various amide containing monomers, and combinations of the foregoing.

The present invention does not utilize and hence is free from N-methylol-functional ethylenically unsaturated monomers including N-methylolamides of ethylenically unsaturated carboxylic acids having 3–10 carbons, such as N-methylolacrylamide, N-methylolmethacrylamide, N-methylolmaleimide, N-methylolmaleinamic acid, N-methylolmaleinamic acid esters, N-methylolamides of the vinyl aromatic acids such as N-methylol-p-vinylbenzamide, and the like. Also essentially excluded or absent from the present latex-forming monomers are mixtures of various N-methylol-functional monomers such as mixtures of N-methylolacrylamide and acrylamide and mixtures of N-methylolmethacrylamide and methacrylamide. If any of such compounds are utilized, the amount is very minute, such as 0.1 part or less and desirably 0.05 parts or less by weight based upon 100 parts by weight of the total monomers, or effective amounts which yield generally 10 parts or less per million and desirably 5 parts or less, or 3 parts or less, or even 2 parts or less of formaldehyde per million of latex binder.

The binders of the present invention are thus essentially free of any chemical functional group (e.g. OH, $NH_2$, COOH) crosslinks, although perhaps contain very minor inherent crosslinking obtained by the reaction of the various unsaturated, non-functional groups (i.e. solely hydrocarbon) such as those in divinyl benzene. The chemical crosslinking which does occur to form the high-gel content of the latex binder composition is thought generally to occur through the remaining unsaturated groups of the reacted butadiene monomers. Should the gel content not be high enough, monomers generating nonfunctional crosslink structures can be utilized such as divinyl benzene discussed more fully hereinbelow.

Optional esters which are often utilized to improve ink gloss coating properties in paper applications include the various alkyl (meth)acrylate and hydroxyl derivatives thereof, wherein the alkyl portion has from 1 to 10, preferably from 1 to 4 carbon atoms with specific examples including butyl acrylate, 2-ethylhexyl acrylate, propyl acrylate, ethyl acrylate, and the like. The amount of such ester monomers is generally from about 0.1 to about 10 parts by weight, and preferably from about 1.0 to about 5 parts by weight for every 100 parts by weight of the one or more vinyl substituted aromatic and conjugated diene monomers.

Optionally, vinyl chloride and vinylidene chloride monomers or combinations thereof can be utilized in amounts from about 0.1 up to about 35 parts by weight and preferably from about 5 percent to about 20 parts by weight for every 100 parts by weight of the one or more vinyl-substituted aromatic and conjugated diene monomers.

Another optional monomer is acrylonitrile which can be utilized in an amount of from about 0.1 to about 25 and desirably from about 5 to about 15 parts by weight for every 100 parts by weight of the one or more vinyl-substituted aromatic and conjugated diene monomers.

Other conventional monomers can optionally be utilized in conventional amounts such as various organic salts, for example sodium styrene sulfonate or the 3-sulfopropyl(meth)acrylate salt of sodium or potassium to control particle size.

The above monomers are polymerized in the presence of water to form the latex binder of the present invention in accordance with conventional emulsion polymerization procedures and techniques. In addition to these monomers, free-radical initiators, optional chain transfer agents, various emulsifiers (such as anionic surfactants), chelating agents, and the like can be utilized as set forth in U.S. Pat. No. 5,166,259, to Schmeing and White, which is hereby fully incorporated by reference.

The free-radical initiators utilized to polymerize the various above latex binder-forming monomers include sodium persulfate, ammonium persulfate, potassium persulfate, and the like. Other free-radical initiators can be utilized which decompose or become active at the temperature utilized during polymerization such as various peroxides, e.g., cumene hydroperoxide, dibenzoyl peroxide, diacetyl peroxide, dodecanoyl peroxide, di-t-butyl peroxide, dilauryl peroxide, bis(p-methoxy benzoyl) peroxide, t-butyl peroxy pivalate, dicumyl peroxide, isopropyl percarbonate, di-sec-butyl peroxidicarbonate; various azo initiators such as azobisdimethylvaleronitrile, 2,2'-azobisisobutyronitrile, 2,2'-azobis(2-amidinopropane) dihydrochloride, 2,2'-azobis-2-methyl-butyronitrile, 2,2'-azobis(methylisobutyrate), and the like, and mixtures thereof. The amount of the free-radical initiators is generally from about 0.25 to about 2.0, and preferably from about 0.5 to about 1.5 parts by weight for every 100 parts by weight of the total monomers.

Optional chain transfer agents include mercaptans such as the alkyl and/or aryl mercaptans having from 8 to about 18 carbon atoms and preferably from about 12 to about 14 carbon atoms. The tertiary alkyl mercaptans having from 12 to 14 carbon atoms are highly preferred. Examples of suitable mercaptans include n-octyl mercaptan, n-dodecyl mercaptan, t-octyl mercaptan, t-dodecyl mercaptan, tridecyl mercaptan, tetradecyl mercaptan, hexadecyl mercaptan, and the like, as well as mixtures thereof. The amount of the chain transfer agent utilized is generally from about 0.01 to about 5 parts by weight and desirably from about 0.1 to about 1.0 part by weight for every 100 parts by weight of the total monomers.

The emulsifiers can generally be any surfactant, soap, or the like, which are well known to the art and to the literature and stable at the pH of the present latexes, that is, from about 1.5 to about 7.0, and include the various alkyl sulfates, the various alkyl sulfosuccinates, the various alkyl aryl sulfonates, the various α-olefin sulfonates, the various quaternary ammonium salts, the various amine salts, nonyl or octyl phenol reaction products of ethylene oxide and the like. The alkyl portion of the various emulsifiers generally has from 8 to 18 carbon atoms. Examples of suitable surfactants which desirably are anionic include sodium lauryl sulfate, various sodium sulfosuccinates such as sodium dimethylamyl sulfosuccinate, e.g., Aerosol MA80, disodium dodecyl diphenyl oxide disulfonate (Dowfax 2A1), sodium dicyclohexyl sulfosuccinate, Aerosol A-196, and the like. Naturally, an amount of an emulsifier is utilized to obtain an aqueous emulsion of the various monomers. Such an amount is typically from about 0.5 to about 5 or 6 parts by weight for every 100 parts by weight of the monomers. Other surfactants can be utilized such as those set forth in *Surface Active Agents*, Schwartz and Perry, Vol. I, Interscience Publishers, Inc., New York, 1958; *Surface Activity*, Moilliet, Collie and Black, D. Van Nostrand Company, Inc., New York, 1961; *Organic Chemistry*, Fieser and Fieser, D.C. Heath and Company, Boston, 1944; and The Merck Index, Seventh Edition, Merck & Co., Inc., Rahway, NJ, 1960, all of which are hereby fully incorporated by reference.

Chelating agents can be utilized during polymerization to tie up various metal impurities as well as to achieve a uniform polymerization. The amounts of such chelating agents is generally small, such as from about 0.01 to about 0.25 parts by weight for every 100 parts by weight of the total weight of the monomers. Examples of suitable chelating agents include ethylene diamine tetraacetic acid, nitrilotriacetic acid, citric acid, and their ammonium, potassium, and sodium salts.

Monomers capable of generating non-functional crosslinked structures during the polymerization of the various monomers and thereby contribute to the creation of a high gel fraction latex are optionally incorporated in amounts of from about 0.5 to about 5 parts by weight, desirably from about 0.1 to about 2 parts by weight and preferably from about 0.1 to about 1 part by weight per 100 parts by weight of the conjugated diene and vinyl substituted aromatic monomers. Examples of such compounds include divinyl benzene, ethylene glycol dimethacrylate, di(isopropenyl) benzene, and the like.

An important aspect of the present invention is the utilization of a ketoxime or amide blocked isopropenyl α,α-dimethyl benzylisocyanate (TMI) compound having the formula

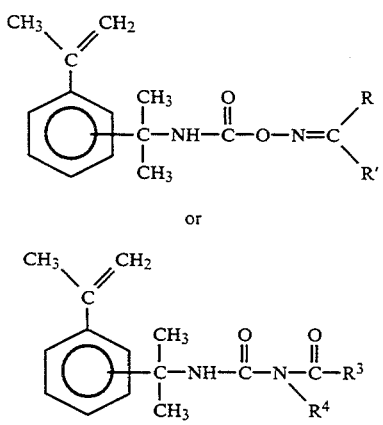

wherein R and R', independently, is an alkyl containing from 1 to about 10 carbon atoms, more desirably from 1 to about 4 carbon atoms, and more preferably 1 or 2 carbon atoms with the ketoxime blocking group, being e.g. acetone oxime, methyl ethyl ketoxime, methyl isobutyl ketoxime, methyl amyl ketoxime, and the like, with methyl ethyl ketoxime being preferred.

Other suitable blocking agents include various primary or secondary amide compounds, wherein $R^4$ is hydrogen, or wherein $R^3$ and $R^4$, independently, is an alkyl, an aryl, or combinations thereof, having from 1 to 10 carbon atoms with 2 to 5 being preferred and wherein $R^3$ can be connected to $R^4$ to form an internal, i.e. cyclic, amide. Examples of suitable amides include caprolactam, pyrrolidone, acetamide, butyramide, benzylamide, and the like.

In either formulation, the isopropenyl group is in either the meta, ortho, or para position with the meta position being preferred.

The amount of the ketoxime-blocked or amide-blocked TMI utilized in the present invention is generally from about 0.25 to about 20 parts; desirably from about 0.5 to about 5.0 parts; and preferably from about 0.5 to about 2.5 parts by weight per 100 parts by weight of the conjugated diene and the vinyl-substituted aromatic monomers.

The various latex-forming monomers of the present invention are polymerized by free radicals according to any conventional method including batch, incremental, or continuous, in the presence of an effective amount of water to enable the formation of an emulsion as well as proper mixing of the various additives, heat transfer, and the like. Polymerization is generally carried out from about 50° C. to about 90° C., and desirably from about 65° C. to about 75° C. Polymerization is generally conducted in an acidic medium when acidic monomers are utilized and the pH of the latex binder is generally from about 1.0 to about 6.5, desirably from about 1.5 to about 4.0, and preferably from about 1.5 to about 3.0 being preferred. Such high polymerization temperatures result in high conversion levels of monomer to copolymer such as at least 90 percent, desirably at least 95 or 98 percent and preferably at least 99 percent. Such latex polymers also contain high gel fractions. That is, generally at least 70 percent by weight to about 95 or 97 percent by weight, desirably at least 80 percent by weight and preferably at least 90 percent by weight, that is of insoluble weight percent fraction in toluene at 20° C. The amount of solids, that is, the copolymer or binder, is generally from about 35 to about 60, and preferably from about 40 to about 50 percent by weight based upon the total weight of the binder and the remaining ingredients, for example, water. The average particle size of the binders after filtering is generally from about 1,000 to about 3,000 Å and desirably from about 1,200 to about 1,500 Å.

An important advantage of the latex binder composition is that it, as well as the binder per se, have very low amounts of aldehyde therein and generally are aldehyde-free. That is, the amount of aldehyde, e.g., formaldehyde, is generally 10 parts or less, desirably 5 parts, 3 parts, or 2 parts or less, and preferably 1 part or 0.7 part or less per million parts by weight of the latex binder composition. Accordingly, the amount of aldehyde in the binder per se is the same as the ranges set forth above, e.g., 10 parts or less by weight based upon one million parts by weight of binder. Another unexpected advantage is that the latex binders have good storage stability in that the aldehyde content thereof essentially remains the same after one day, one week, two weeks, three weeks, and even four weeks. For example, after 28 days, the amount of aldehyde in the latex binder composition is still appreciably the same, i.e., within 5 or 7 percent of the original or initial aldehyde content.

The latex binder also has good coagulation stability. Thus, very low levels of coagulant, especially fine-size coagulant such as that retained on 325 Tyler mesh, exist after filtering of the latex, that is, 0.1 percent or less, desirably 0.05 percent or less, more desirably 0.02 percent or less, and preferably 0.01 percent or less by weight based upon the total weight of the latex solids. Low levels of coagulant exist even after extended periods of time, for example, three months, six months, and even nine months. At six months, the amount of coagulant retained on 325 Tyler mesh, after filtering the latex, is generally 0.05 percent or less, desirably 0.02 percent or less, and preferably 0.01 or less by weight based upon the total weight of the latex solids.

The latex binder of the present invention has many applications and can be utilized on cellulosic nonwoven materials such as paper, e.g., offset printing paper, towels, various paper tapes, paper containers, and the like, and is particularly well suited for industrial wipes and toweling. When utilized as a paper coating, the binder generally comprises about 10 percent by weight of the paper coating formulation with a great majority of the same being comprised of clay, and the like, whereby the binder serves to bind the clay to the paper surface. The latex binder can also be applied to other non-woven substrates such as non-woven fibers, e.g., polyester, polypropylene, rayon, or nylon, or combinations of cellulosic and synthetic fibers, to non-woven textiles such as mats, to carpet backings, to various disposable products for use in the medical industry such as face masks, gowns, gloves, and the like.

Although the high gel fraction binders of the present invention are generally highly crosslinked, application of the same to a substrate, and the like, resulting in the formation of a laminate, etc., and the subsequent application of heat results in deblocking of the ketoxime- or amide-blocked TMI with further crosslinking. The same results in the improvement of various properties such as wet tear strength of the composite or laminate, improved bond strength between various fibers or laminates, and the like. The cure temperature with regard to the application of the binder to a non-woven, non-cellulosic substrate is generally from about 100° C. to about 170° C. whereas the cure temperature with respect to cellulose or paper substrates is generally from about 70° to about 100° C. During cure, the generated free isocyanate groups generally react with functional groups such as amide or hydroxyl located in other polymers thereby crosslinking the same, with hydroxyl groups as contained in the cellulose substrate, and thereby form chemical bonds yielding good adhesion, improved wet tensile strength, wet rub, and the like.

A specific use of the latex binder of the present invention is to bind a paper coating composition to a cellulose substrate as shown in FIG. 1 wherein the cellulose is generally indicated by the number 10. The paper coating composition 12 is known to the art and to the literature and generally includes various fillers such as high brightness clay pigments, calcium carbonate, titanium dioxide, small amounts of sodium hydroxide to control the pH, small amounts of calcium stearate to act as a lubricant, water, sodium polyacrylic acid to act as a dispersant for the clay, starch, for example, oxidized starch, protein binders such as soybean protein, polyvinyl alcohol binders, and the like. From about 4 to about 25 parts by weight and desirably from about 5 to about 20 parts by weight of the latex binder solids, i.e., dry binder, per 100 parts of filler (e.g., clay, calcium carbonate, titanium dioxide, etc.) is generally utilized and the same are mixed along with the above-noted other paper coating additives in any conventional mixer, e.g., a Cowles blade mixer or a ball mill. The paper-coating composition containing a small amount of the latex binder of the present invention is then coated on a paper substrate as by using an air knife coater, a blade coater, or a roll coater. The substrate is then dried in a conventional hot-air oven and/or infrared drying oven. The paper is then generally super-calendered at elevated temperatures as from about 70° C. to about 100° C., and at high pressure whereby cure of the binder 15 occurs binding the paper coating composition to the cellulose substrate. The coating or laminate thus produced has improved wet tear strength.

Figure 2:
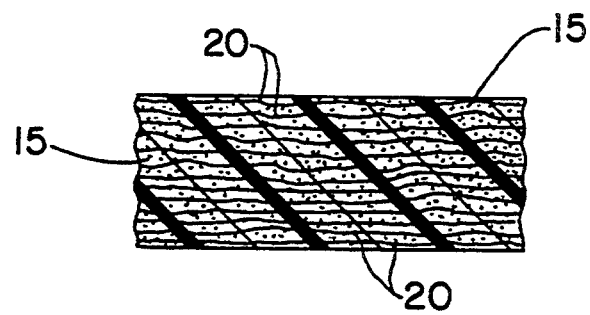
FIG. 2 relates to a cross-sectional view of nonwoven fibers bound to one another with the latex binder of the present invention.

The high gel fraction latex binder 15 of the present invention can be applied to non-woven fibers 20 such as polyester, cellulosic, or mixtures of cellulosic and synthetic fibers to bind the same together, see FIG. 2. The binder can be applied to the fibers in any conventional manner as by spraying an approximately 20 percent solid latex solution, and the like. Upon heating the high gel fraction binder to cure temperatures of approximately 100° to about 170° C., the TMI becomes unblocked and reacts in a manner as set forth above thereby binding the various fibers or strands together.

The invention will be better understood by reference to the following examples which serve to illustrate the invention, but not to limit the same.

Apparatus

A one-gallon, stainless steel pressure reactor equipped with monomer addition ports, stirrer, and temperature and pressure measurement devices was used. Cooling was provided by an external water bath.

EXAMPLE 1

A mixture of deionized water 1045 g, Dowfax 2A1 (15 percent) 25 g, itaconic acid 22 g, Aerosol A196 (10 percent) 105 g, EDTA solution (40 percent) 4 g and styrene 112 g were stirred and heated to 65° C. (under nitrogen). A solution of sodium persulfate 7.5 g in deionized water 142 g was then added to the reactor. After 30 minutes the monomer and aqueous streams as set forth in Table I were added to the reactor at 60° C. over a period of 6 hours.

TABLE I

| AQUEOUS STREAM | MONOMER STREAM |
| --- | --- |
| DI water 320 g | Styrene 576 g |
| Dowfax 2A1 (15%) 60 g | Butadiene 690 g |
| | Acrylamide (50%) 60 g |
| | Divinyl Benzene (55%) 6.25 g |
| | Hydroxyethyl Acrylate 30 g |
| | TMI/MEKO 30 g |
| | Dodecyl mercaptan 3.75 g |

After 6 hours the temperature was raised to 71° C. and the reaction continued for 3 hours (total solids approximately 44 percent). The pH of the high gel fraction latex binder was 2.1 and the amount of gel at 20° C. in toluene was 90 percent. The conversion of monomers to polymer was at least 99 percent.

Post-Addition re Storage and Stability

The following was added to the reactor and then the latex was steam-stripped and filtered in a conventional manner.

Dowfax 2A1 (15 percent) 20 g, D.I. water 85 g, 28% ammonia 25 gDREW L 198 antifoam 4 g Proxel GXL (25%) biocide 8 g, Bostex 490B (35%) antioxidant 20 g.

| Properties | |
|---|---|
| Total solids content: | 44.2 percent |
| pH: | 7.3 |
| Surface tension: | 40 dynes/cm |
| Brookfield viscosity: | 50 cps |
| Particle size: | approx 1450 Å |
| Coagulation collected on 325 Tyler mesh: | 3.0 grams |

The above binder made in accordance with the present invention contained less than 0.7 part by weight of formaldehyde per million parts by weight of the latex binder. The amount of formaldehyde after 28 days of aging was also less than 0.7 parts per million.

EXAMPLE 2

A conventional latex binder composition control (Latex 1 of Table II) was prepared in a manner similar to Example I as were latexes A, B and C of the present invention. The amounts indicated are in weight units, i.e., control contained 46 parts by weight styrene, 50 parts by weight butadiene, 2 parts by weight acrylic acid, 1.5 parts by weight itaconic acid and 0.5 parts by weight divinyl benzene.

Each of the above latexes were applied to Whatman sheets and dried for 5 minutes at 315° F. (158° C.). The amount of latex applied in each case was 20 percent by weight (45 percent solids) of the total weight of the latex and paper.

The dried sheets were then tested for yellowness, wet tensile strength (in water), and solvent tensile strength using a variety of different solvents such as toluene, heptane, mineral spirits. The solvent tensile test is an average tensile strength of paper soaked in toluene, heptane and mineral spirits for a period of 3 hours and tested immediately thereafter without drying. The results indicate that the latex compositions of the invention have a lower yellowness index and much better wet tear strength and average solvent tear strength than the first control. The second control shows that a conventional or typical styrene-butadiene polymer made utilizing N-methylol acrylamide and acrylamide while having good wet tensile strength and average solvent tensile properties having exceeding high amounts, that is 120 parts per million of formaldehyde.

EXAMPLE 3

Two latex binder compositions in accordance with the invention were prepared in a manner as set forth in Example 1 and had the composition shown in Table III. The samples were then tested for mechanical stability by determining the amount of coagulum formed after 30 minutes of shearing in a high speed blender. The data shows that the inclusion of carboxylic acids results in dramatic improvements in coagulation stability. It was also observed that the inclusion of carboxylic acids in the latex composition provides for better processing in the reactor.

TABLE II

| LATEX | COMPOSITION | Y.I. | WET TENSILE LBS. | AVERAGE SOLVENT TENSILE, LBS. | FORMALDE-HYDE PPM |
|---|---|---|---|---|---|
| Control | STY/BD/AA/IA/DVB 46/50/2.0/1.5/0.5 | 8.4 | 17.7 | 16.1 | 10 |
| A | STY/BD/IA/AA/HEA/TMI MEKO/DVB 43.25/48.75/1.5/2.0/2.0/2.0/0.5 | 7.1 | 21.7 | 29.7 | <0.7 |
| B | STY/BD/IA/AAD/HEA/TMI MEKO/DVB 46/46/1.5/2.0/2.0/2.0/0.5 | 7.3 | 23.0 | 32.0 | <0.7 |
| C | STY/BD/IA/AAD/TMI MEKO/DVB 48/46/1.5/2.0/2.0/0.5 | 7.3 | 22.0 | 25.0 | <0.7 |
| Control | A commercial styrene-butadiene copolymer made with 2.5 N-methyl acrylamide and 2.5 acrylamide | 8.1 | 22.0 | 28.0 | 120 |

BD = BUTADIENE
YI = YELLOWNESS INDEX
IA = ITACONIC ACID
AAD = ACRYLAMIDE
AA = ACRYLIC ACID
HEA = HYDROXYETHYL ACRYLATE
DVB = DIVINYL BENZENE
TMI MEKO = METHYLETHYLKETOXIME of m-TMI

TABLE III

| LATEX COMPOSITION | REACTOR "CLEANLINESS" | MECHANICAL STABILITY |
|---|---|---|
| STY/BD/IA/AA/TMI.MEKO 48.5/46/1.5/2/2 | Good | 16 PPM (0.0016%) |
| STY/BD/TMI.MEKO 52/46/2 | Build up of Polymer on Walls of Reactor | 178,071 PPM (17.81%) |

NOTE:
IA = Itaconic Acid
AA = Acrylic Acid

EXAMPLE 4

COMPARATIVE EXAMPLE USING UNBLOCKED TMI MONOMER

When a latex was prepared in a manner similar to Example 1 except that the TMI.MEKO and hydroxyethyacylate was omitted and 30 g of TMI monomer were substituted, the polymer emulsion was very unstable in a colloidal sense and the product flocculated in the reactor was approximately 60 percent of the reaction ingredients. The polymer emulsion changed to a solid thick mass which could not be further processed. Thus, physical test data could not be obtained.

While in accordance with the Patent Statutes a best mode and preferred embodiment has been presented, the scope of the invention is not limited thereto, but rather is measured by the scope of the attached claims.

What is claimed is:

1. In an article comprising a cellulosic substrate and a paper coating composition bound to said substrate by a binder made by the emulsion polymerization of monomers comprising a primary comonomer component of one or more conjugated diene monomers having from 4 to 8 carbon atoms and one or more vinyl-substituted aromatic monomers having from 8 to 12 carbon atoms; and from one or more functional containing monomers in an amount of from about 0.1 to about 15 parts by weight per 100 parts by weight of said primary comonomer component, the improvement comprising the use of from about 15 to 50 percent by weight of said one or more conjugated diene monomers and from about 50 to about 85 percent by weight of said one or more vinyl substituted aromatic monomers, and a blocked crosslinking agent in an amount of from about 0.5 to about 20 parts by weight per 100 parts by weight of said primary comonomer component, said crosslinking agent being one or more ketoxime or amide blocked isopropenyl α,α-dimethyl benzyl isocyanate compounds having the formula

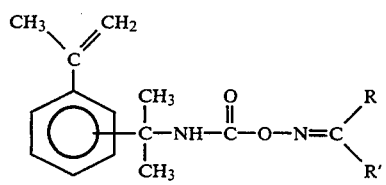

or

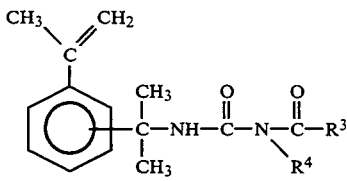

wherein R and R' independently, is an alkyl having from 1 to 10 carbon atoms, and $R^4$ is hydrogen, or wherein $R^3$ and $R^4$, independently is an alkyl, an aromatic, or combinations thereof having from 1 to 10 carbon atoms, or wherein said $R^3$ and $R^4$ are connected to form an internal amide.

2. In a coated cellulose substrate according to claim 1, wherein the amount of said conjugated diene is from about 25 to about 40 percent by weight and the amount of said vinyl substituted aromatic is from about 60 to about 75 percent by weight, wherein R and $R^1$ independently is methyl or ethyl, wherein $R^3$ and $R^4$ are joined together and is caprolactam, wherein the amount of said one or more ketoxime or amide blocked isopropenyl e, amethyl benzyl isocyanate compounds is from about 0.5 to about 5.0 parts per 100 parts by weight of said primary comonomer component, and wherein said isopropenyl group is located in the meta position.

3. In an article comprising non-woven fibers bound together by a binder made by the emulsion polymerization of monomers comprising a primary comonomer component of at least one or more conjugated diene monomers having from 4 to 8 carbon atoms and one or more vinyl-substituted aromatic monomers having from 8 to 12 carbon atoms; and from one or more functional containing monomers in an amount of from about 0.1 to about 15 parts by weight per 100 parts by weight of said primary comonomer component, the improvement comprising the use of from about 25 to 60 percent by weight of said one or more conjugated diene monomers and from about 40 to about 75 percent by weight of said one or more vinyl substituted aromatic monomers, and a blocked crosslinking agent in an amount of from about 0.5 to about 20 parts by weight per 100 parts by weight of said primary comonomer component, said crosslinking agent being one or more ketoxime or amide blocked isopropenyl α,α-dimethyl benzyl isocyanate compounds having the formula

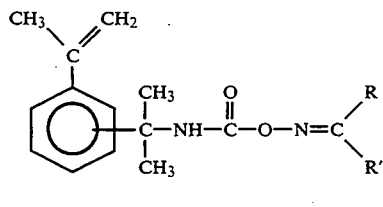

or

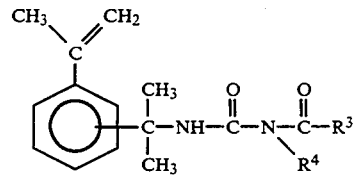

wherein R and R' independently is an alkyl having from 1 to 10 carbon atoms, and $R^4$ is hydrogen, or wherein $R^3$ and $R^4$, independently, is an alkyl, an aromatic, or combinations thereof having from 1 to 10 carbon atoms, or wherein said $R^3$ and $R^4$ are connected to form an internal amide.

4. In an article according to claim 3, wherein the amount of said conjugated diene is from about 30 to about 50 percent by weight and the amount of said vinyl substituted aromatic is from about 50 to about 80 percent by weight, wherein R and $R^1$ independently is methyl or ethyl, wherein $R^3$ and $R^4$ are joined together and is caprolactam, wherein the amount of said one or more ketoxime or amide blocked isopropenyl α,α-methyl benzyl isocyanate compounds is from about 0.5 to about 5.0 parts per 100 parts by weight of said primary comonomer component, and wherein said isopropenyl group is located in the meta position.

* * * * *